(12) United States Patent
Lohken

(10) Patent No.: US 8,129,649 B2
(45) Date of Patent: Mar. 6, 2012

(54) MAGNETIC ARC WELDING METHOD FOR WORKPIECES WITH OPEN CROSS-SECTIONS

(75) Inventor: Thomas Lohken, Constance (DE)

(73) Assignee: Georg Fischer Engineering AG, Schaffhausen (CH)

( * ) Notice: Subject to any disclaimer, the term of this patent is extended or adjusted under 35 U.S.C. 154(b) by 213 days.

(21) Appl. No.: 12/475,892

(22) Filed: Jun. 1, 2009

(65) Prior Publication Data
US 2009/0294425 A1    Dec. 3, 2009

(30) Foreign Application Priority Data

Jun. 3, 2008 (EP) ...................................... 08104227

(51) Int. Cl.
*B23K 9/08* (2006.01)

(52) U.S. Cl. .......................................... 219/61; 219/123

(58) Field of Classification Search .................. 219/59.1, 219/60 R, 60.2, 61, 61.12, 123
See application file for complete search history.

(56) References Cited

U.S. PATENT DOCUMENTS 4,864,706 A * 9/1989 Jenkel ......................... 29/889.21

FOREIGN PATENT DOCUMENTS

| DE | 2258417 | | 6/1974 |
|---|---|---|---|
| DE | 10 2006 012 826 | | 5/2007 |
| GB | 2010029 A | * | 6/1979 |
| JP | 51-133156 A | * | 11/1976 |
| JP | 51129841 A | * | 11/1976 |
| JP | 51135849 A | * | 11/1976 |
| JP | 63-260679 A | * | 10/1988 |
| WO | 2006/000330 | | 1/2006 |

* cited by examiner

*Primary Examiner* — Geoffrey S Evans
(74) *Attorney, Agent, or Firm* — Bachman & LaPointe, P.C.

(57) ABSTRACT

A method for Magnetic Arc welding for metallic materials wherein at least one of the workpieces to be welded has an open cross-section. The method comprises bracing the two workpieces and moving them together, wherein the open cross-section of one workpiece is bridged by a metallic auxiliary part to form a conducting closed region, and after the activation of a magnetic field of a magnet coil system and of the current required for welding, the workpieces are placed with a defined spacing and an electric arc is ignited, the magnetic field of the magnet coil system sets the electric arc in rotation in order to uniformly heat the end surfaces to be welded, and subsequently, the surfaces, which are to be welded, of the workpieces are pressed against one another.

8 Claims, 3 Drawing Sheets

MAGNETIC ARC WELDING METHOD FOR WORKPIECES WITH OPEN CROSS-SECTIONS

BACKGROUND OF THE INVENTION

The invention relates to methods for Magnetic Arc welding for metallic materials, with at least one of the workpieces to be welded having an open cross-section.

At present, Magnetic Arc welding methods are known in which, generally, the workpieces to be connected have rotationally symmetrical cross-sections. Said workpieces, which are usually tubular, are braced in alignment in mounts and are moved together at the welding points. After a magnetic field and the current required for the welding are activated, the workpieces are placed with a defined spacing and an electric arc is ignited. A magnetic field of a magnet coil system provides that the electric arc is set in rotation. The end surfaces to be welded are thereby uniformly heated. Subsequently, the surfaces, which are to be welded, of the workpieces are pressed against one another. The magnetic field and the welding current are switched off.

Said method is already used for workpieces with closed cross-sections. Magnetic Arc welding methods of said type are described for example in DE 10 2006 012 826 A1, the laid-open specification DE 2258417 and WO 2006/000330.

The invention is based on the object of creating a Magnetic Arc welding method for workpieces, which are to be welded, with open cross-sections.

SUMMARY OF THE INVENTION

The foregoing object is achieved according to the invention in that the two workpieces are braced and moved together, with the open cross-section of one workpiece being bridged by means of a suitable metallic auxiliary part to form a conducting closed region, in that, after the activation of a magnetic field of a magnet coil system and of the current required for welding, the workpieces are placed with a defined spacing and an electric arc is ignited, in that the magnetic field of the magnet coil system sets the electric arc in rotation, in that the end surfaces to be welded are uniformly heated and in that, subsequently, the surfaces, which are to be welded, of the workpieces are pressed against one another, with the open surface region (13) of the auxiliary part (4) not being pressed, or being pressed only very lightly, against the opposite surface (8) of the workpiece (1).

The principle of the Magnetic Arc welding method has been known for a long time. However, it could hitherto be used only for workpieces with closed cross-sections. Since closed cross-sections of the workpieces are required for the use of the Magnetic Arc welding method, the essence of the invention is that of alternatively closing the workpiece with the open cross-section during the actual welding process by means of a part of arbitrary shape. While the workpieces to be welded are pressed together, the auxiliary part is not pressed, or is pressed only very lightly, against the end side of the opposite part, specifically in order to prevent welding of the auxiliary part. The auxiliary part may in particular be removed after the welding process.

Further preferred refinements of the method are specified in the subclaims. In particular, the open cross-section of a workpiece to be welded and the shape of the auxiliary part are not restricted to a circular shape. The design of the auxiliary part may be suitably adapted to the open cross-section, which is likewise of arbitrary design, of the workpiece to be welded.

It is essential that a closed conducting region is generated for an electric arc to be formed which, on account of a magnetic field, rotates.

BRIEF DESCRIPTION OF THE DRAWINGS

The method according to the invention is illustrated by way of example in the drawings, in which.

DETAILED DESCRIPTION

Figure 1:
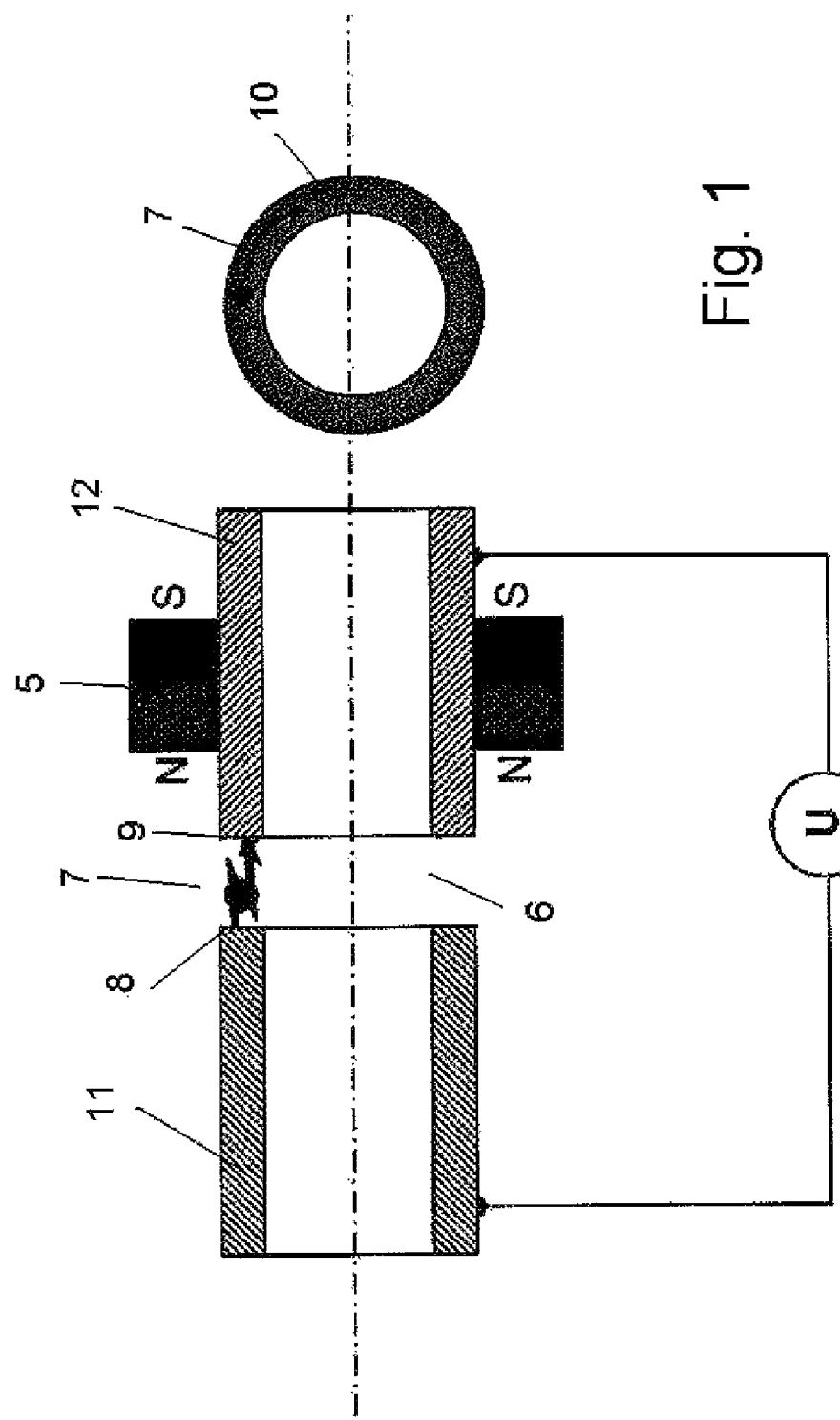
FIG. 1 shows the principle of the Magnetic Arc welding method according to the prior art, FIGS. 2a and b show a diagrammatic illustration of an example of the Magnetic Arc welding method according to the invention.

FIG. 1 shows the Magnetic Arc welding process according to the prior art. The two workpieces 11 and 12, which are to be welded, with closed circular cross-sections 10 are braced and are moved together so as to leave a spacing 6, with the end surfaces 8 and 9 to be welded being situated opposite one another. A magnet coil system 5 is arranged around the workpiece 12. After the magnetic field with the poles N and S of the magnet coil system 5, and the required voltage U, are switched on, an electric arc 7 is ignited. The magnetic field of the magnet coil system sets the electric arc 7 in rotation, such that the end surfaces 8, 9 to be welded are heated uniformly. Once the temperature required for welding is reached, the end surfaces 8 and 9, which are to be welded, of the workpieces 11 and 12 are pressed against one another. After cooling, the welding process is complete.

Figure 2:
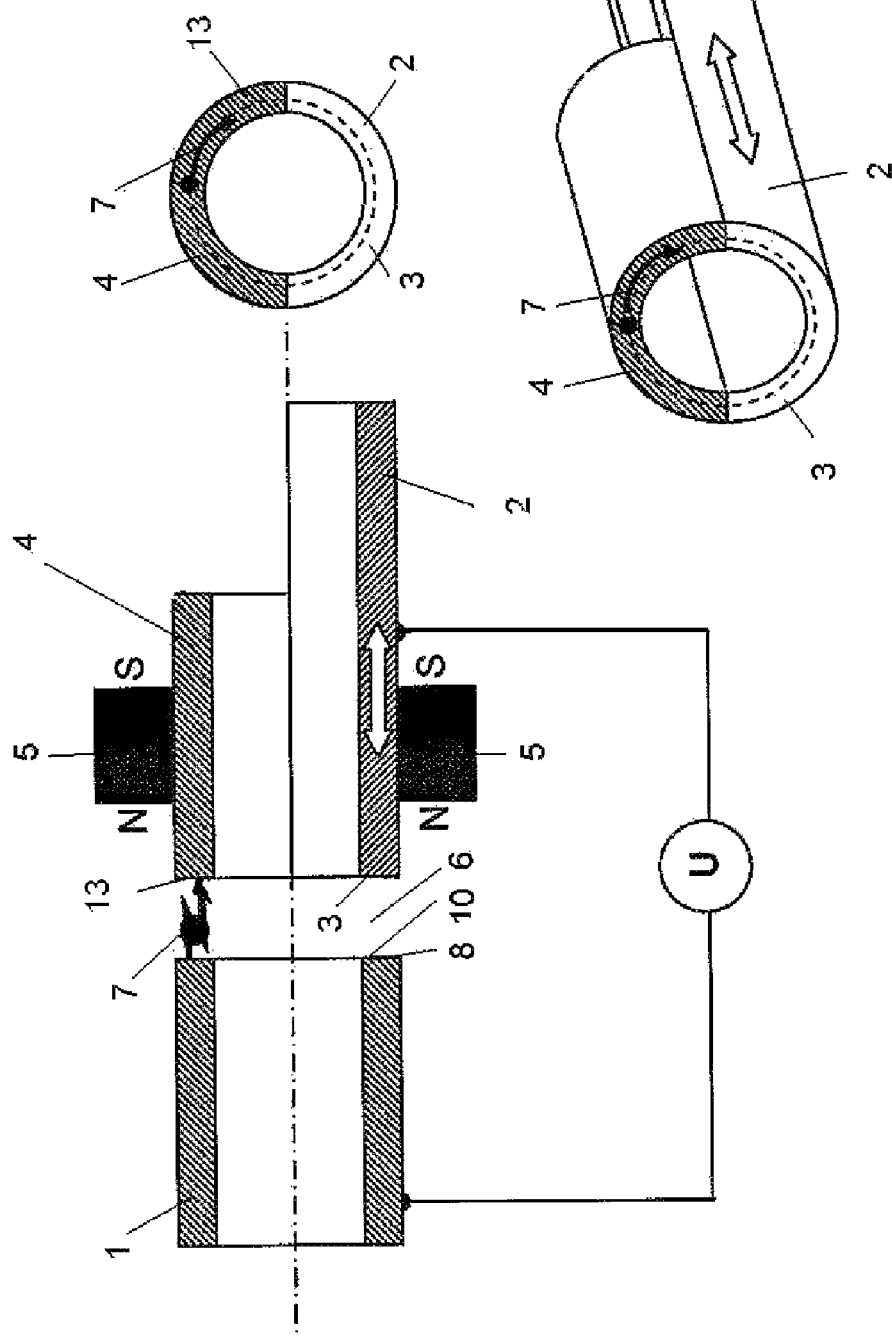

FIG. 2a shows, analogously to FIG. 1, the method according to the invention on the basis of an example. FIG. 2b shows the arrangement of the workpieces 1 and 2 and the auxiliary part 4 in three-dimensional form. Here, the two workpieces 1 and 2 are to be welded.

Figure 3:
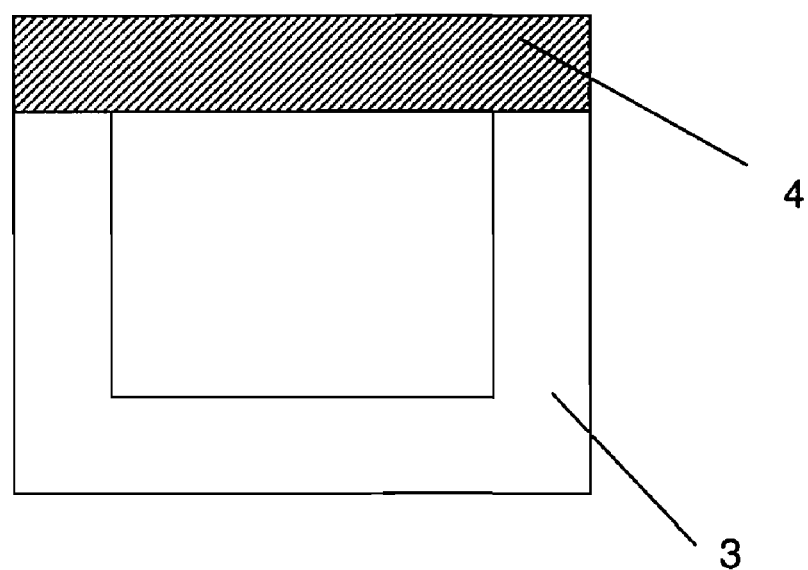
FIG. 3 is an illustration of the U-shaped workpiece.

The workpiece 1 is of tubular design with a closed circular cross-section 10. The workpiece 2 has a semi-circular open cross-section 3. The method proceeds in the same way as in the description with regard to FIG. 1. However, said method can be carried out only when it is possible to close the open semi-circular cross-section 3 in order to be able to form a rotating electric arc 7 by means of the magnetic field coil system 5 and the applied voltage U. This takes place according to the invention by means of the auxiliary part 4 shown here in the example with a semi-circular open surface 13. Said auxiliary part 4 is placed on the workpiece 2 in such a way as to generate a closed end surface which, before the actual welding process, is moved together with the end surface 8 of the opposite workpiece 1 so as to leave a spacing 6. The auxiliary part 4 may be attached to the contact surfaces of the open region of the workpiece before the welding process in a wide variety of ways, for example by spot welding etc. By means of said auxiliary part 4, the electric arc 7 can circulate along the closed circular path which is thus formed. After the end surface 8 to be welded and the open end surface 3 of the workpiece 2 are heated to the suitable temperature (until the molten and compressible phase is reached), only the workpiece 2 is welded to the workpiece 1 under very high pressure. The open surface region 13 of the auxiliary part 4 is not loaded with pressure or is only very lightly loaded with pressure in order to prevent welding. If required, the auxiliary part 4 may be removed after the welding process. The workpiece may have a U-shaped cross-section as shown in FIG. 3.

The advantages associated with said invention are in particular that it is possible to connect even workpieces with open cross-sections by means of the known Magnetic Arc welding method. It is of course also conceivable for workpieces which both have open cross-sections to be welded by means of said method according to the invention. It is likewise possible for the required magnet coil system to be arranged on one of the two workpieces to be connected or in a distributed fashion on both workpieces.

The invention claimed is:

1. A method for welding two metallic workpieces wherein at least one of the workpieces to be welded has an open cross-section, comprising the steps of:
    moving the two workpieces together wherein the open cross-section of the at least one workpiece is bridged by a metallic auxiliary part to form a conducting closed region;
    activating a magnetic field of a magnet coil system and obtaining a current required for welding;
    placing the two workpieces with a defined spacing and igniting an electric arc wherein the magnetic field of the magnet coil system sets the electric arc in rotation, and end surfaces of the two workpieces to be welded are uniformly heated; and
    thereafter pressing the end surfaces of the two workpieces against one another, wherein an open surface region of the metallic auxiliary part is not pressed, or pressed only very lightly, against an opposite surface of the one workpiece having an open cross-section.

2. A method according to claim 1, wherein the open cross-section of the one workpiece is U-shaped.

3. A method according to claim 2, wherein the metallic auxiliary part is designed such that, by means of said metallic auxiliary part, the U-shape is formed into a closed rectangle.

4. A method according to claim 1, wherein the open cross-section of the one workpiece forms an open circle perimeter.

5. A method according to claim 1, wherein the metallic auxiliary part is designed such that, by means of said metallic auxiliary part, the open cross-section of the one workpiece is formed into a closed circle.

6. A method according to claim 1, wherein the open cross-section is of arbitrary shape and, together with the metallic auxiliary part, which is likewise of arbitrary shape, forms a closed region.

7. A method according to claim 1, including locating the magnet coil system on at least one of the workpieces.

8. A method according to claim 1, including removing the metallic auxiliary part after welding of the workpiece is completed.

* * * * *